(12) United States Patent
Iwasaki et al.

(10) Patent No.: US 6,445,698 B1
(45) Date of Patent: Sep. 3, 2002

(54) TWO WIRE DDS TRANSPORT SYSTEM

(75) Inventors: Sean Iwasaki, Chicago; Carl Erite, Glen Ellyn, both of IL (US)

(73) Assignee: HyperEdge Corporation, Itasca, IL (US)

( * ) Notice: Subject to any disclaimer, the term of this patent is extended or adjusted under 35 U.S.C. 154(b) by 0 days.

(21) Appl. No.: 09/149,390

(22) Filed: Sep. 8, 1998

(51) Int. Cl.[7] .............................................. H04L 12/50
(52) U.S. Cl. ...................................... 370/359; 370/524
(58) Field of Search ................................. 370/359, 524

(56) References Cited

U.S. PATENT DOCUMENTS

| | | |
|---|---|---|
| 3,917,907 A | 11/1975 | Bartelink |
| 4,370,741 A | 1/1983 | Haass |
| 5,566,166 A | 10/1996 | Lee et al. |
| 6,034,973 A | * 3/2000 | Sanderson .................. 370/359 |

OTHER PUBLICATIONS

Motorola Advance Information for Model MC145572 ISDN U–Interface Transceiver, Rev.2, pp. 1–1 to 1–3, 5–1 to 5–5 and Appendix B, Nov. 1996.

AT&T Advance Data Sheet for Model T7237 ISDN U–Interface Transceiver, p. 56, Apr. 1996.

TELTREND Practice for Model 0CU4444 (RP), May 1995.

ADTRAN Practice for Model Smart DDB–OCU (DDS PWR), Nov. 1993.

ADTRAN Practice for Model DDST III LP, Oct. 1993.

TELTREND Practice for Model DDI5730, Jun. 1992.

* cited by examiner

*Primary Examiner*—Melvin Marcelo
(74) *Attorney, Agent, or Firm*—Patula & Associates, P.C.

(57) ABSTRACT

A two wire DDS Transport System is disclosed wherein digital signals are transported over a single channel between transmission line elements transporting digital data between a Network Service Provider and a Customer's Premises. ISDN U-Interface Transceivers having scaled operating frequencies and data buffers are provided in the transmission line elements, such as an Office Channel Unit (OCU) and a Network Interface Unit (NIU) to increase operating distance.

18 Claims, 7 Drawing Sheets

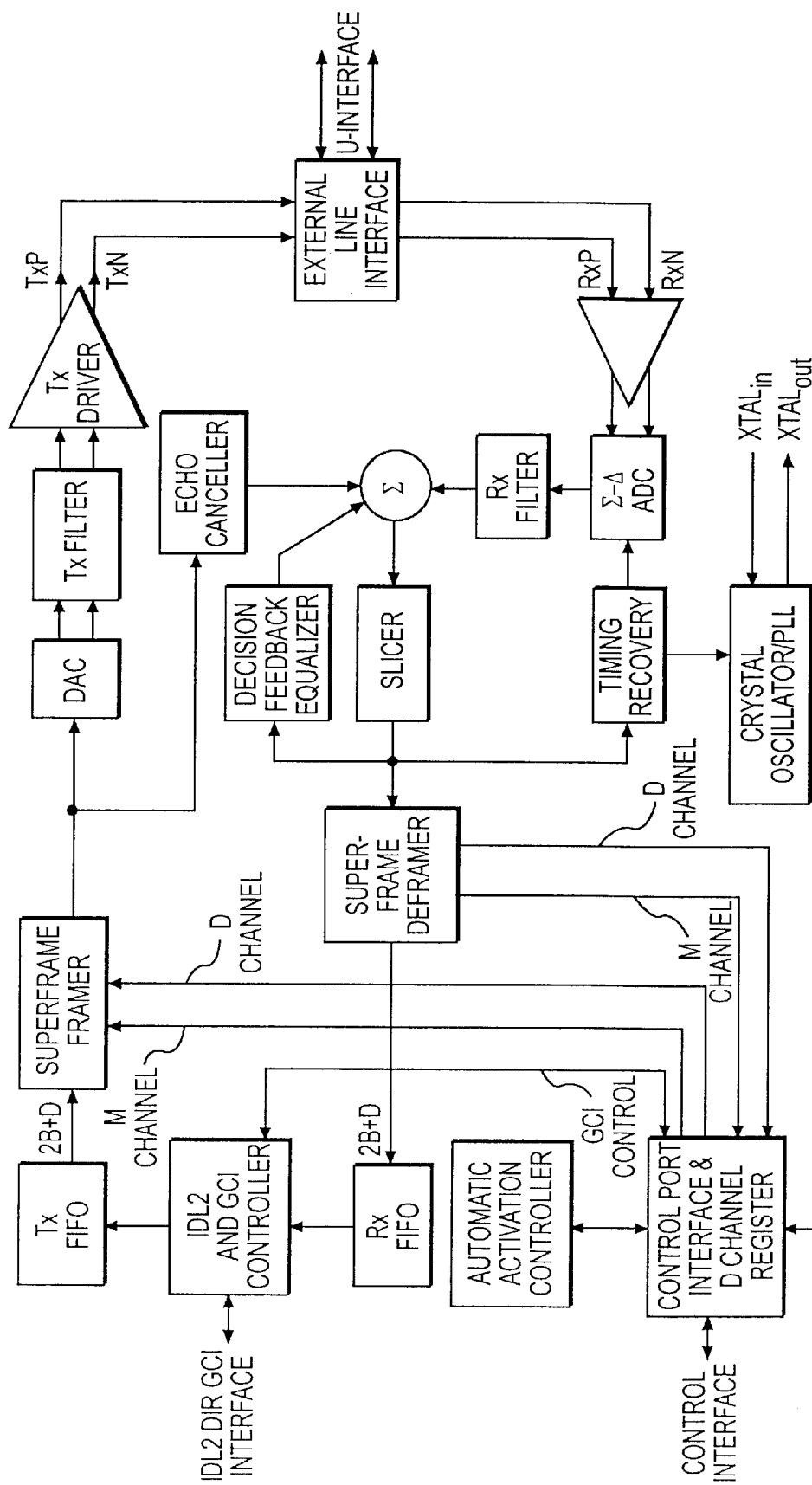
FIG. 1B *(PRIOR ART)*

TWO WIRE DDS TRANSPORT SYSTEM

The present invention relates to Telecommunications Digital Data Service (DDS) Transport Systems for digital signal transmission over telephone channels between transmission line elements, for example equipment used by a Network Service Provider to provide DDS to the Customer Premises and, specifically, to a two wire DDS Transport System using commercially available ISDN U-Interface Transceivers.

BACKGROUND OF THE INVENTION

DDS was developed many years ago to utilize digital transmission techniques as contrasted to voice-band modems that carry the digital signals in analog form over telephone channels. This all-digital approach takes advantage of the regeneration, monitoring and protection applicable to digital signals. This provides a higher-quality service than can be realized using analog telephone systems for data communications. The Network Service Providers offered DDS to the customer's premise equipment (CPE). DDS provides this high performance digital transmission of data using a four wire (two wire pairs) transmission medium. Two wires (one pair) are dedicated for transmitting data, while the other two wires (one pair) are dedicated for receiving data. DDS supports variable data rate that can range from 1.2 kb/s to 64 kb/s.

The Network Service Providers deliver DDS to the CPE by using an Office Channel Unit (OCU) and a Network Interface Unit (NIU). The OCU and NIU are typically located at the Network's Central Office and Customer Premises, respectively. The OCU and NIU incorporates various options that allows the Network Service Providers the ability to remotely sectionalize problems, comply to the DDS tariffs and provide data rate adaption.

Prior art DDS is transmitted from the OCU 3 at the Network Provider's Central Office 2 to the NIU 5 of the Customer's Premises over two wire pairs 6a, 6b and 7a, 7b (four wires) (see FIG. 1). However, Network Service Providers are having a combination of the following problems: Copper wire shortages—the cost of implementing four wires from the Network Service Provider's Central Office to the Customer's Premises is high. DDS Distance Limitations—if the Customer is beyond the transmission operating distance of existing DDS equipment, the Network Service Providers must install a DDS Repeater to extend the DDS to the Customer. The use of DDS Repeaters are used on DDS transmission rates of 56 kb/s and 64 kb/s. The transmission operating distance is a function of the DDS transmission rate. The higher the DDS transmission rate, the shorter the DDS transmission operating distance. The cost of the DDS Repeater equipment, the DDS Repeater Mounting, and the DDS Repeater installation and maintenance is very high. Performance Limitations—the present DDS transmission methodology involves the use of Alternate Mark Inversion line coding.

Accordingly, it is desirable to decrease the four wire delivery to a two wire delivery service. However, it is foreseen that attempts to do so would either limit the DDS transmission operating distance or require costly custom transceiver designs.

For example, there exists other non-ISDN transmission technologies such as DDS, traditional telephone service (Plain Old Telephone Service or POTS), Data (Ethernet, for example), or a combination of the these which can be transported over two wires using the ISDN U-Interface Transceivers. All of these technologies operate the ISDN U-Interface Transceivers at the ISDN line rate of 80 kbaud/s (data rate of 160 kbits/s). This 80 kbaud/s line rate is defined as an International Telecommunication standard for ISDN services at U-Interface demarcation point. The ISDN U-Interface Transceivers are manufactured to specifically operate at the line rate of 80 kbaud/s. Thus, prior art DDS transmission utilizing the ISDN U-Interface Transceivers at a line code rate of 80 kbaud/s does not operate at a far enough distance to eliminate the need to install DDS Repeaters. For this reason, DDS transmission is typically provided utilizing the four-wire system illustrated in FIG. 1.

Prior to the present invention, there existed only one effective two-wire DDS Transport System involving the OCU and NIU. This system, designed by Adtran, Inc. of Huntsville, Ala., utilizes a custom transceiver that uses an alternative line code called Simple Coded Pulse Amplitude Modulation (SCPAM). Such SCPAM transceivers utilize a custom chip set to produce the SCPAM line code and operate at delivery rates up to 64 kb/s. This system utilizes a termination unit which converts the SCPAM signal back to the industry standard AMI interface for delivery to the customer. However, the time and costs involved with the development of such custom transceivers are prohibitive.

The present invention solves the above identified problems by using commercially available ISDN U-Interface Transceivers to provide an effective two wire DDS (see FIG. 2). However, as stated above, ISDN U-Interface Transceivers are designed to transport ISDN service at 80 kbaud/s, which would have similar operating distances as existing four wire DDS at 56 kb/s or 64 kb/s transmission rates. Accordingly, to overcome these distance limitations, the present invention modifies these transceivers by scaling the operating frequency and incorporating a data buffer within the line elements, for example the OCU and NIU, to increase operating distance between the line elements.

BRIEF SUMMARY OF THE INVENTION

The present invention relates to using ISDN U-Interface Transceivers into transmission line equipment such as OCU and NIU type equipment to provide a two wire DDS Transport System characterized by increased operating distance. The problem of using ISDN U-Interface Transceivers is in their operating distance limitation for DDS. To be an effective delivery system for DDS, it is very desirable to operate at longer distances than what the transceiver can normally provide. To overcome the distance limitation of using ISDN U-Interface Transceivers, the present invention scales the operating frequency of the transceiver and incorporates a data buffer within the transmission line equipment, such as the OCU and NIU to allow the use of U-Interface Transceivers to provide effective single channel (two wire) DDS transmission between transmission line elements.

Accordingly, it is the principle object of the present invention to provide for an effective two wire DDS transmission, without using a custom transceiver.

It is a further object of the present invention to provide for a cost-effective, two wire DDS transmission without distance limitations which would require DDS Repeaters.

It is another object of the present invention to provide for the use of ISDN U-Interface Transceivers in a two wire DDS Transport System characterized by increased operating distance.

It is also an object of the invention to provide a two wire DDS transport system comprising an ISDN U-Interface Transceiver having a scaled frequency and a data buffer within the transmission line elements.

Numerous other advantages and features of the invention will become readily apparent from the detailed description of the preferred embodiment of the invention, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein:

FIG. 1B is a functional block diagram of a prior art Motorola MC145572 ISDN U-Interface Transceiver.

DETAILED DESCRIPTION OF THE PREFERRED EMBODIMENT OF THE PRESENT INVENTION

Figure 1A:
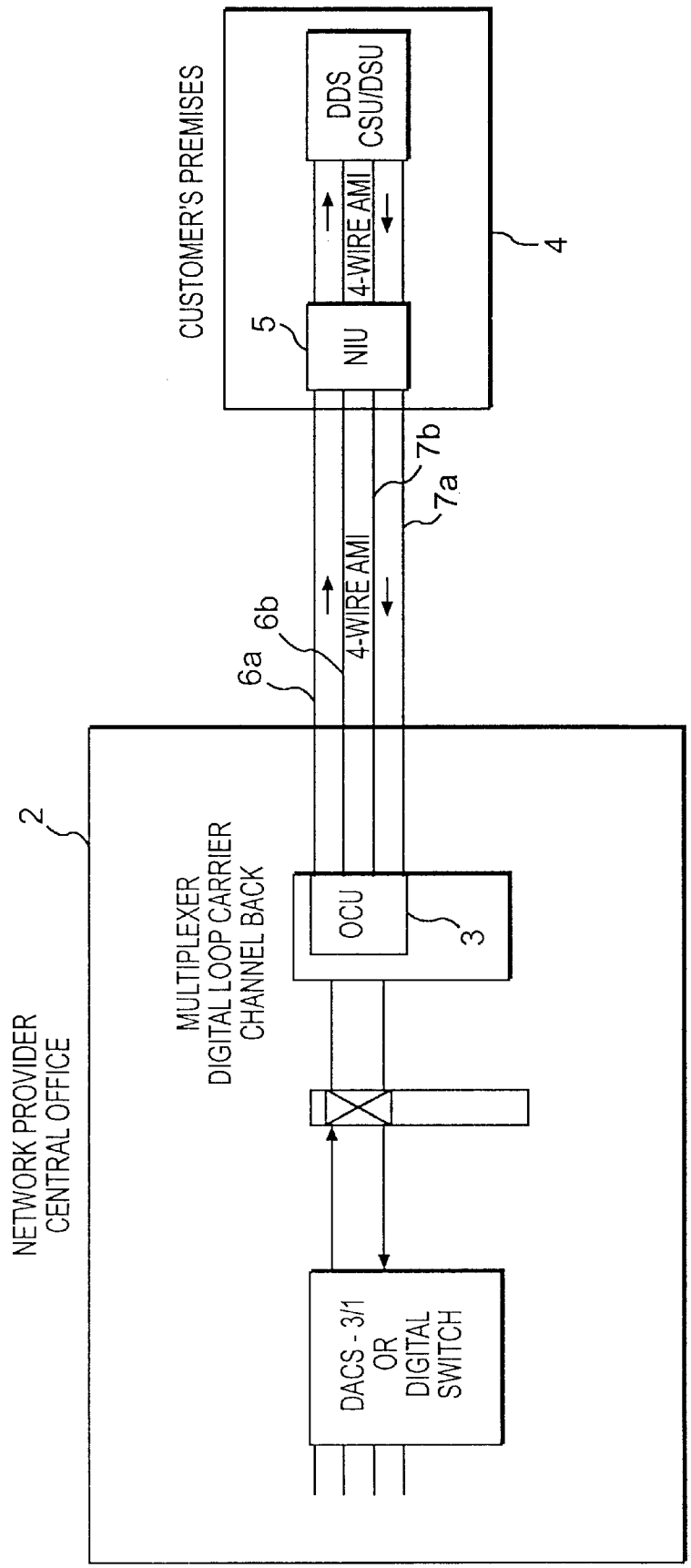
FIG. 1A is a schematic drawing of a prior art DDS Transport System.

While the invention is susceptible of embodiment in many different forms, there is shown in the drawings and will be described herein in detail a preferred embodiment of the present invention. It should be understood, however, that the present disclosure is to be considered an exemplification of the principles of the invention and is not intended to limit the spirit and scope of the invention and/or claims of the embodiment illustrated. For example, the present disclosure will be described in detail with respect to the transmission line elements as being an office channel unit (OCU) and a network interface unit (NIU). However, it should be understood that the principles of the present invention can be utilized in any telecommunications transmission line equipment.

Figure 2:
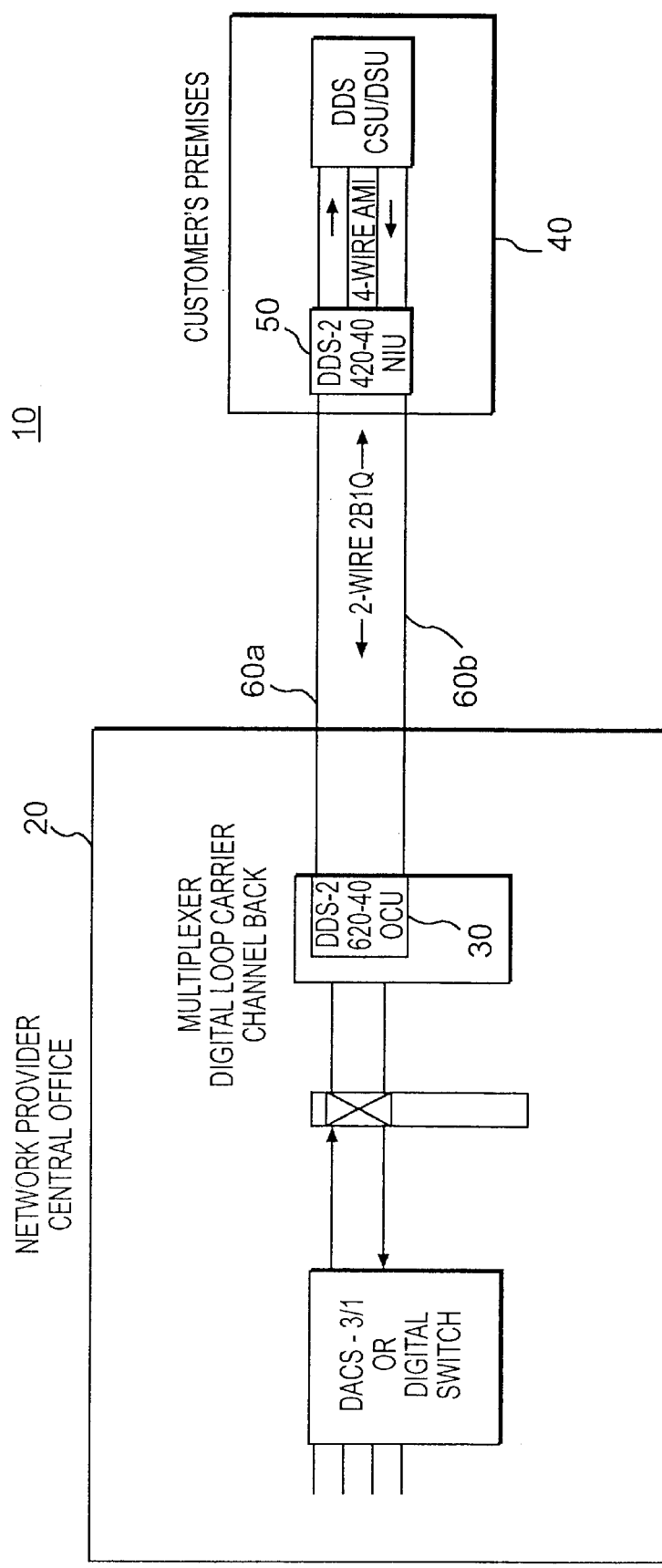
FIG. 2 is a schematic drawing of the two wire DDS Transport System of the present invention.

FIG. 2 illustrates a schematic drawing of the present invention 10. As can be seen, the present invention 10 achieves DDS transmission from the OCU 30 at the Network Provider's Central Office 20 to and from the NIU 50 at the customer's premises 40 over a single wire pair 60a, 60b. This two wire DDS transmission is achieved by providing the OCU 30 and the NIU 50 with ISDN U-Interface Transceivers having scaled operating frequency, and a data buffer means. The scaling of the frequency and the reasons therefore are described in detail next.

Figure 1C:
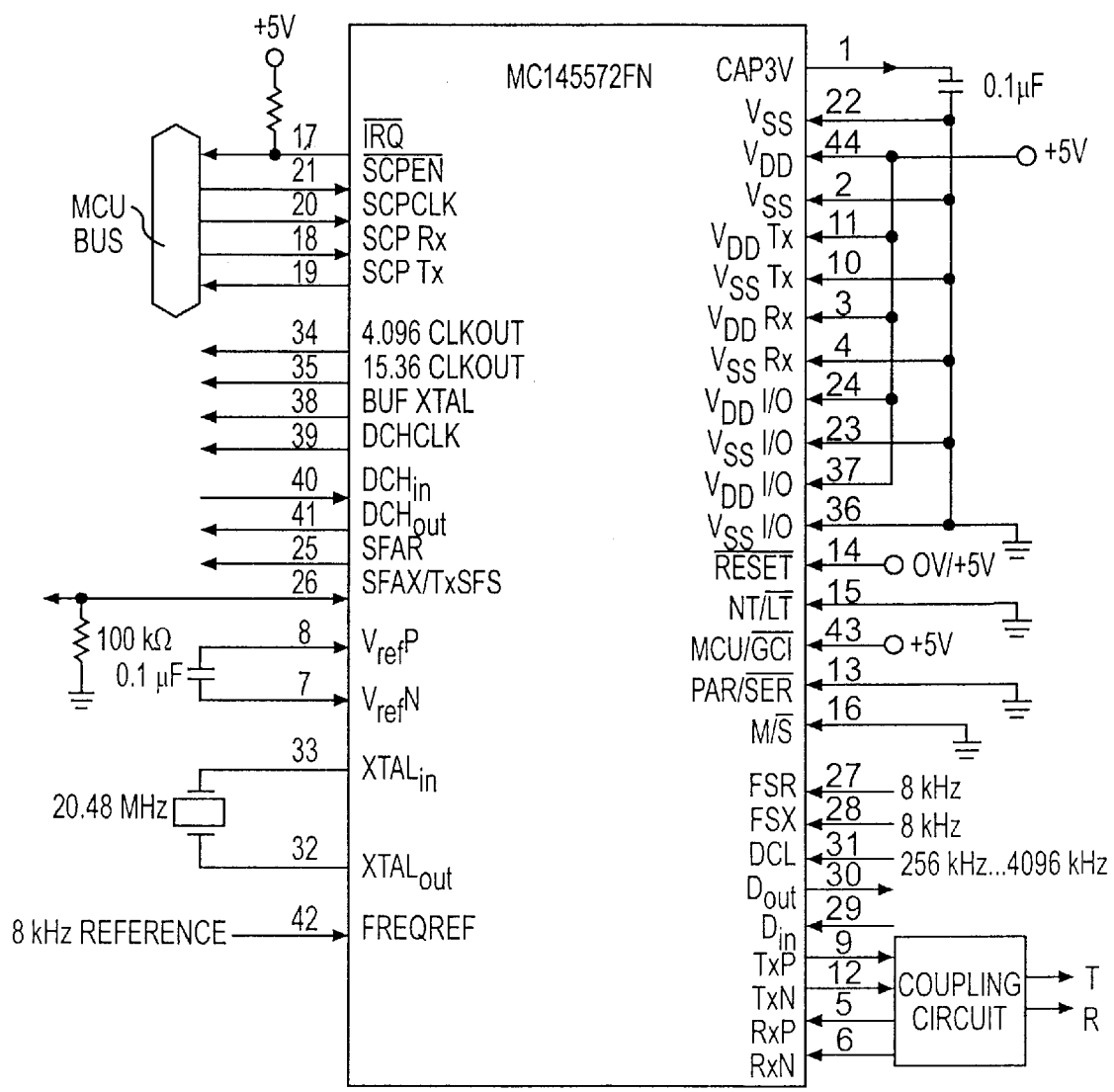
FIG. 1C is a schematic drawing of the prior art Motorola MC145572 ISDN U-Interface Transceiver of FIG. 1B showing its pin configurations.

The present invention uses commercially available ISDN U-Interface Transceivers to transport DDS over two wires. Commercially available ISDN U-Interface Transceivers operate at a transmission rate of 160 kbits/s over two wires. Currently, common prior art DDS (FIG. 1) operates at a transmission data rate of 64 kbits/s or lower over four wires. DDS can be transported over two wires using ISDN U-Interface Transceivers or custom transceivers, but the ISDN U-Interface Transceiver will limit DDS to an unacceptable operational distance, and custom transceivers are cost prohibitive.

The ISDN U-Interface Transceiver uses a 2B1Q (2 Binary 1 Quaternary) line code for the signal transmission. The 2B1Q line code is a four level pulse amplitude modulated signal that efficiently represents two data bits as one line code symbol using alternate mark inversion (AMI). The representation of the data as well as the use of AMI results in a signal whose power spectrum operates at an efficient frequency bandwidth. A transmission data rate of 160 kbits/s is represented by a 2B1Q line code rate of 80 kbaud/s (1 baud=2 data bits). Scaling the transmission data rate will directly scale the 2B1Q line code rate, thereby shifting the frequency placement of the 2B1Q line code signal's power spectrum. Decreasing the 2B1Q line code rate will shift the signal power spectrum to operate at a lower frequency. A signal's power spectrum that operates at a lower frequency has the advantage of the 2B1Q signal being less attenuated through the cable. Cable attenuation causes the 2B1Q signal to decrease in voltage amplitude. The longer the cable, the greater the 2B1Q signal attenuation.

Choosing the appropriate transmission data rate involves considering the various DDS data rates, DDS operating distance, minimal component changes, design complexity, and cost. Other than the ISDN U-Interface Transceiver of the present invention, the majority of ISDN U-Interface Transceivers are not capable of operating at a line rate other than 80 kbaud/s. However, we have determined that the Motorola MC145572 ISDN U-Interface Transceiver (see prior art FIGS. 1B and 1C) will operate at a transmission data rate that is scaled by a factor of ½ or 80 kbit/s (2B1Q line code signal rate of 40 kbaud/s).

The table below compares the operating distance between an ISDN U-Interface Transceiver operating at a transmission data rate of 160 kbits/s (2B1Q line code rate of 80 kbaud/s) and 80 kbits/s (2B1Q line code rate of 40 kbaud/s) referenced on 26 gauge PIC cable and with 45 dB receiver sensitivity (typical 2B1Q signal level for the ISDN U-Interface Transceiver operation).

| U-Interface Transceiver transmission data rate | Attenuation | Distance |
| --- | --- | --- |
| 160 kbits/s | 14.25 dB/Mile | 16,674 Feet |
| 80 kbits/s | 11.5 dB/Mile | 20,661 Feet |

The ISDN U-Interface Transceiver operating distance increased by 3,987 feet when the transmission data rate is scaled to 80 kbit/s.

Figure 4:
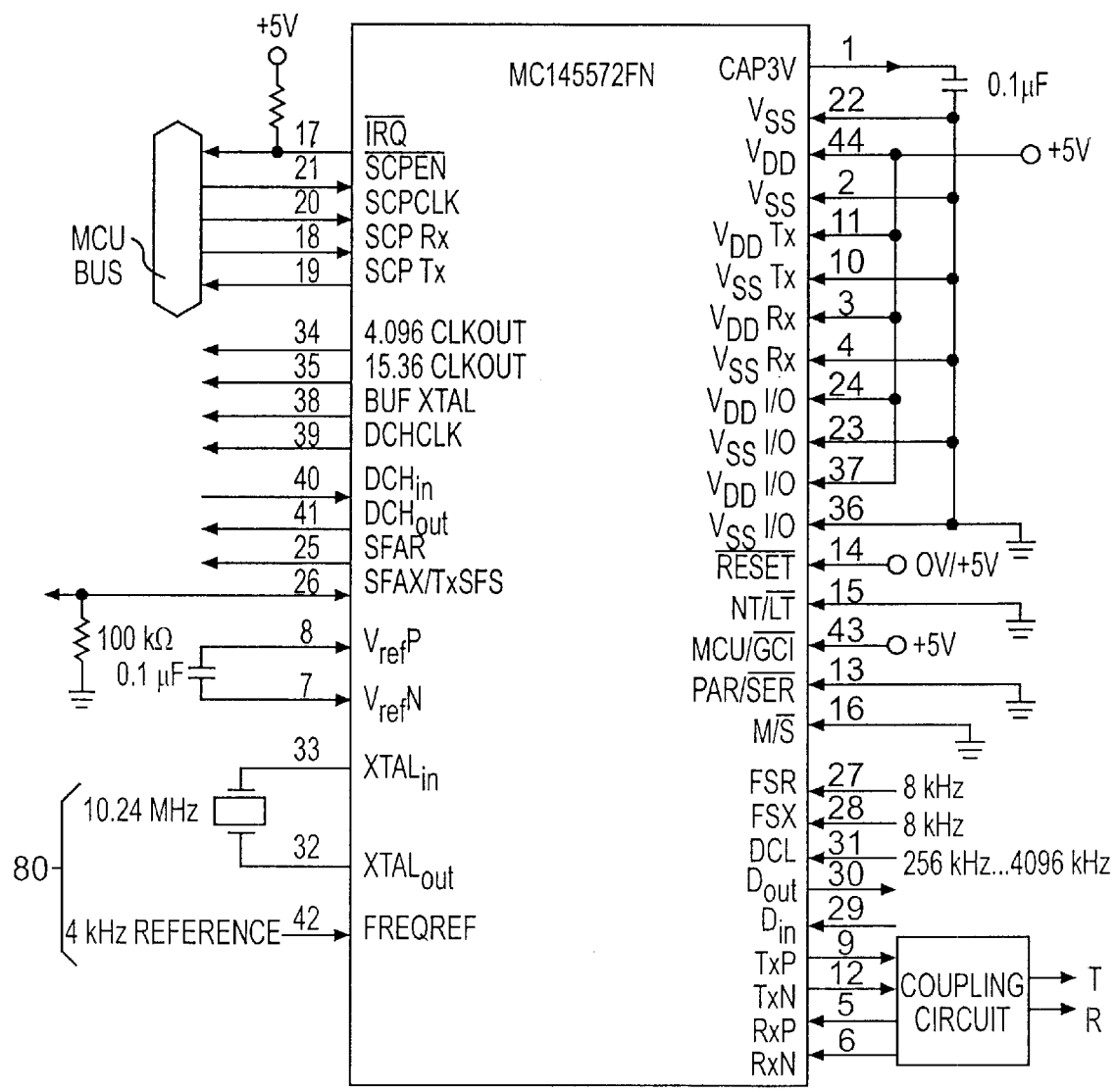
FIG. 4 is a schematic drawing of the modified ISDN U-Interface Transceiver of the present invention showing the means for scaling its frequency.

The ISDN U-Interface Transceiver's transmission data rate is determined by the frequency applied from an external crystal component. The frequency of the external crystal component is specific for each ISDN U-Interface Transceiver manufacturer. For example, the Motorola ISDN U-Interface Transceiver requires an external crystal component whose oscillating frequency is 20.48 MHz (see FIG. 1C). To operate the ISDN U-Interface Transceivers at the transmission data rate of 80 kbit/s (2B1Q line code rate of 40 kbaud/s), the external crystal component frequency must also be appropriately scaled. For the Motorola ISDN U-Interface Transceiver, the external crystal component must be scaled by a factor of ½ (10.24 MHz) (see FIG. 4).

The ISDN U-Interface Transceiver was designed to transport ISDN Basic Rate Interface (BRI) service. ISDN service has a transmission data rate of 160 kbits/s, which consists of two Bearer Channels (64 kbits/s per B-Channel), one Data Channel (16 kbit/s), and one Overhead Channel (16 kbit/s). The 160 kbit/s transmission data rate is frequency referenced to an 8,000 Hz clock pulse that is typically provided by the connecting equipment (equipment that is located at the Network Provider's Central Office). This 8,000 Hz clock pulse is applied to the ISDN U-Interface Transceiver as a reference for the transport of 20 data bits every 8,000 Hz. In other words, 20 data bits transported every 8,000 Hz results in the transport of 160,000 data bits every second (160 kbit/s) (20 data bits×8,000 Hz, where Hz=1/s). Thus, each B-Channel represents 8 data bits transported every 8,000 Hz, the D-Channel and the Overhead Channel represents 2 data bits transported every 8,000 Hz, respectively. This 8,000 Hz pulse is used as the standard sampling rate for the conversion of various analog or digital signals to a digital time-domain multiplexing pulse code modulation (PCM) data format. This PCM data format is a telecommunication industry standard that allows for interoperability among telecommunication equipment.

The ISDN U-Interface Transceiver was designed to always transport 20 data bits per the reference clock pulse. To operate the ISDN U-Interface Transceiver at the transmission data rate of 80 kbit/s (signal rate of 40 kbaud/s), the 8,000 Hz reference clock pulse of the transceiver at the connecting equipment must also be scaled by ½ (see FIGS. 3A and 4). Thus, 20 data bits transported every 4,000 Hz results in the transport of 80,000 data bits every second (80 kbit/s).

Since the telecommunication network is based upon the 8,000 Hz sampling rate, each B-Channel of the ISDN U-Interface Transceiver will receive 8 data bits from and must transmit 8 data bits to the connecting equipment every 8,000 Hz (64 kbit/s). Since the modified ISDN U-Interface Transceiver is now referenced at a 4,000 Hz clock pulse for the transport of 20 data bits, the 8 data bits received by the B-channel from the Network equipment must be stored (buffered) until another 8 data bits is received. This will allow 16 data bits applied to the ISDN U-Interface Transceiver every 4,000 Hz (64 kbit/s). When transmitting to the connecting equipment, data buffering is needed to buffer the 16 data bits from the ISDN U-Interface Transceiver and deliver 8 data bits to the connecting equipment. The remaining 4 data bits that represent the D-Channel and Overhead Channel are used for additional communications and overhead functionality between the ISDN U-Interface Transceivers of the two-wire DDS transport system. Presently, the 4 data bits do not require data buffering.

Data buffering can be accomplished using many different methodologies. For example, data buffering can be implemented using a storage and logic means in a hardware only implementation, a hardware and software implementation, or a software only implementation. The selection of which implementation to use depends mainly on design complexity and cost. The method to implement data buffering can change many times due to technology changes, price changes, or other factors. It should be understood that any suitable data buffering means can be implemented and used in the present invention.

Data buffering provides the means for data transfer between an interface referenced at a 8,000 Hz clock pulse and the ISDN U-Interface Transceiver referenced at a 4,000 Hz clock pulse. The concept of data buffering involves the minimum storage of two data bytes, two data buffer to storage 16 bits to interface to the ISDN U-Interface Transceiver.

Figure 3A:
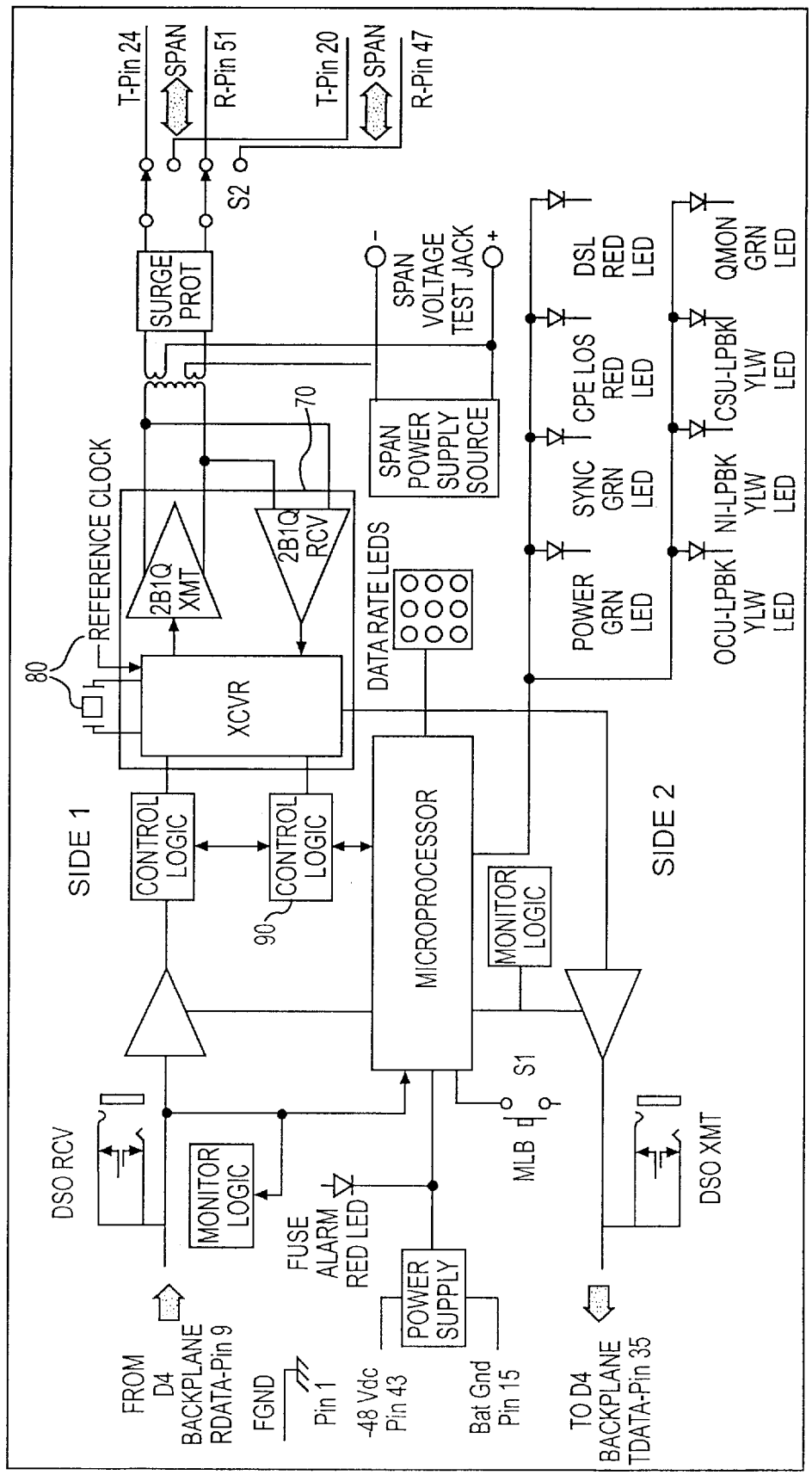
FIG. 3A is a block diagram of a first line element of the present invention.
Figure 3B:
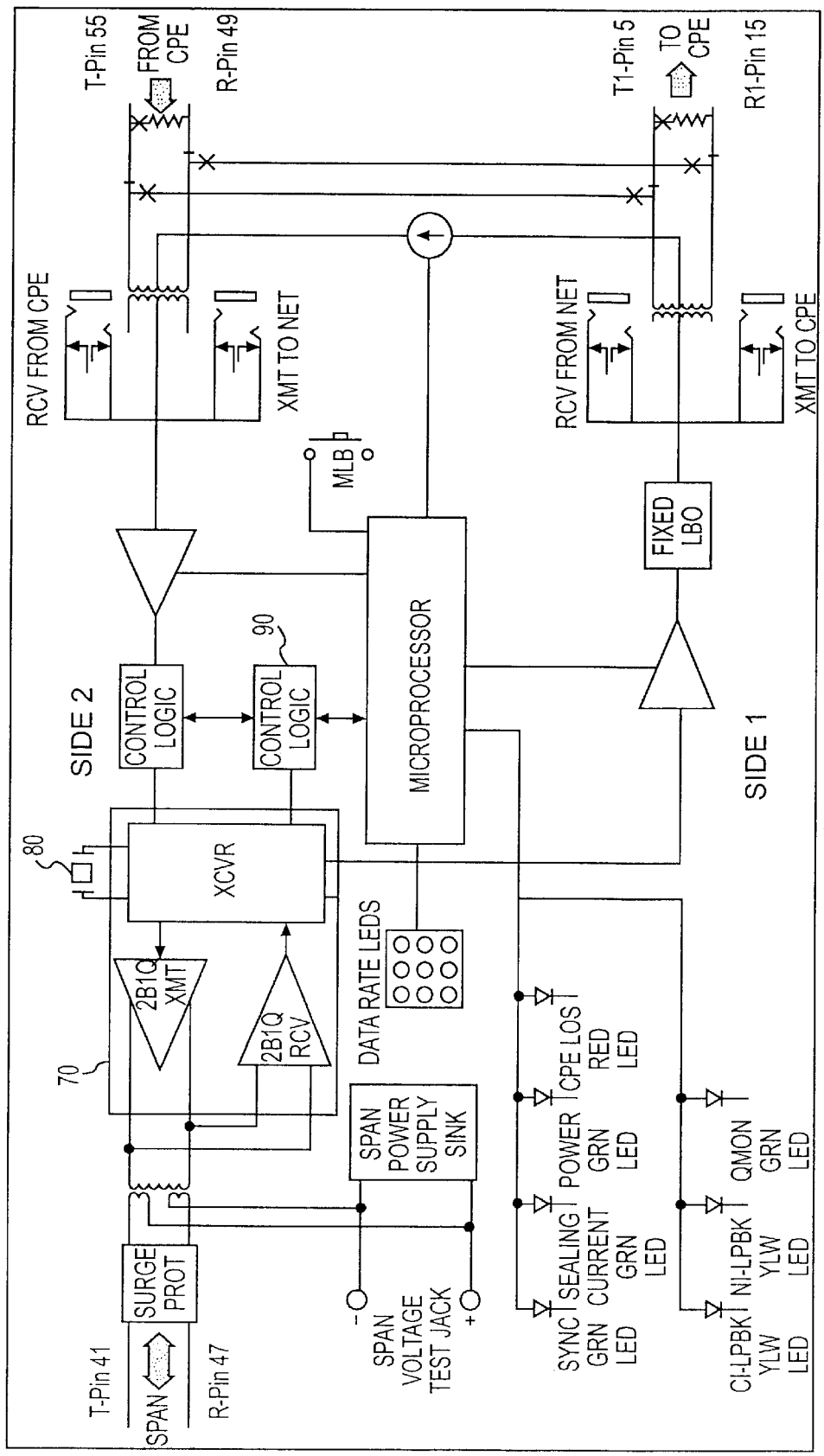
FIG. 3B is a block diagram of a second line element of the present invention.

Accordingly, FIGS. 3A and 3B illustrate block diagrams of OCU 30 and NIU 50, respectively. As can be seen, both the OCU 30 and the NIU 50 include an ISDN U-Interface Transceiver 70, a means 80 for scaling the operating frequency of the transceivers 70 and a data buffer means 90.

The use of ISDN U-Interface Transceivers 70 in the OCU 30 and the NIU 50 having scaled operating frequency through means 80 and by providing a data buffering means 90 in the OCU 30 and the NIU 50 allow for two wire DDS transport. By doing so, the operating distance is increased to provide an efficient, cost-effective system.

It is to be understood that the embodiments herein described are merely illustrative of the principles of the present invention. Various modifications may be made by those skilled in the art without departing from the spirit or scope from the claims which follow.

What is claimed is:

1. A digital data service transport system for transporting digital data to and from a network provider's facility to a customer's premises, said system comprising:

a first line element having an ISDN U-Interface Transceiver;

a second line element having an ISDN U-Interface Transceiver; and a single wire pair operatively connecting said first line element with said second line element;

said ISDN U-Interface Transceivers having an operational frequency modified from a standard frequency.

2. The system of claim 1, wherein said system further includes a data buffer.

3. A two-wire digital data transport system for transporting digital data service between telecommunication network equipment, said system comprising:

an ISDN U-Interface Transceiver for receiving data from and transmitting data to said network equipment, said ISDN U-Interface Transceiver having a means for modifying the operating frequency of the transceiver; and a data buffer for buffering data received and transmitted by said transceiver;

said system characterized as having an increased operating distance.

4. A method for increasing the operating distance between two line elements in a digital data service transport system, said method comprising the steps of:

providing said two line elements with an ISDN U-Interface Transceiver;

modifying the frequency of said ISDN U-Interface Transceiver; and buffering data received and transmitted by said ISDN U-Interface Transceiver.

5. The system of claim 1, wherein said modified operational frequency is scaled from said standard frequency by a factor of one half.

6. The system of claim 5, wherein said modified operational frequency results in a transmission rate scaled by a factor of one half.

7. The system of claim 6, wherein said scaled transmission rate is 80 kbit/s.

8. The system of claim 6, wherein said transmission rate is defined by an external crystal component having a frequency of 10.24 MHZ, and a reference clock pulse of 4,000 Hz.

9. The system of claim 3, wherein said means for modifying the operating frequency of the transceiver comprises an external crystal component and a reference clock scaled by one half.

10. The system of claim 9, wherein said external crystal component is scaled to a frequency of 10.24 MHZ.

11. The system of claim 9, wherein said reference clock is scaled to a clock pulse of 4000 Hz.

12. The system of claim 9, wherein said external crystal component is scaled to a frequency of 10.24 MHZ, and said reference clock is scaled to a clock pulse of 4000 Hz.

13. The system of claim 11, wherein said data buffer allows for data transfer between said ISDN U-Interface Transceiver referenced at a 4000 Hz clock pulse and said network equipment referenced at an 8000 Hz clock pulse.

14. The system of claim 12, wherein said data buffer allows for data transfer between said ISDN U-Interface Transceiver referenced at a 4000 Hz clock pulse and said network equipment referenced at an 8000 Hz clock pulse.

15. The method of claim 4, wherein said step of modifying the frequency of said ISDN U-Interface Transceiver comprises the step of scaling the frequency of an external crystal component and the clock pulse of a reference clock of said ISDN U-Interface Transceiver by one half.

16. The method of claim 15, wherein said scaled frequency of said external crystal component is 10.24 MHZ.

17. The method of claim 15, wherein said scaled clock pulse of said reference clock is 4000 Hz.

18. The method of claim 15, wherein said scaled frequency of said external crystal component is 10.24 MHZ, and said scaled clock pulse of said reference clock is 4000 Hz.

* * * * *